United States Patent
Viaud

(10) Patent No.: US 7,111,548 B2
(45) Date of Patent: Sep. 26, 2006

(54) ROUND BALER ARRANGED TO FACILITATE THE INSTALLATION OF ENDLESS BALING ELEMENTS

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 16 days.

(21) Appl. No.: 11/032,622

(22) Filed: Jan. 10, 2005

(65) Prior Publication Data

US 2005/0160922 A1     Jul. 28, 2005

(30) Foreign Application Priority Data

Jan. 27, 2004   (EP) ................... 04001653

(51) Int. Cl.
   *B30B 5/04*    (2006.01)
   *A01D 39/00*   (2006.01)

(52) U.S. Cl. .................. 100/35; 100/87; 100/89; 56/341

(58) Field of Classification Search .......... 100/35, 100/87, 88, 89, 100; 56/341, 344
   See application file for complete search history.

(56) References Cited

U.S. PATENT DOCUMENTS 4,088,069 A * 5/1978 Soteropulos ............. 100/88
4,339,907 A * 7/1982 Kopaska et al. ............ 56/341
5,333,516 A   8/1994 Edwards et al.
6,722,110 B1  4/2004 Royneberg

FOREIGN PATENT DOCUMENTS

| DE | 40 12 755 | 4/1990 |
| EP | 1 151 657 | 4/2001 |
| EP | 1 285 571 | 8/2001 |
| EP | 1 308 078 | 9/2002 |
| WO | WO 98/17097 | 9/1997 |

* cited by examiner

*Primary Examiner*—Derris H. Banks
*Assistant Examiner*—Jimmy T. Nguyen

(57) ABSTRACT

A large round baler includes a bale forming assembly and a chassis constructed as separate units which, when disconnected and displaced from each other either entirely at an interface between the units or by tilting one unit about a longitudinal axis at one side of the interface, permit one or more flexible endless baling elements to be mounted in place on the baling assembly. Cross beams, which extend between and interconnect the opposite side structures of the bale forming assembly are located such, that they do not obstruct the space required to slide the endless baling element(s) over the baling assembly and into engagement with the bale forming rolls. Mounting of the flexible endless baling element requires the removal of one or more baling element support rolls from opposite side structures of the baling assembly and/or from opposite arms of a tensioning assembly.

1 Claim, 4 Drawing Sheets

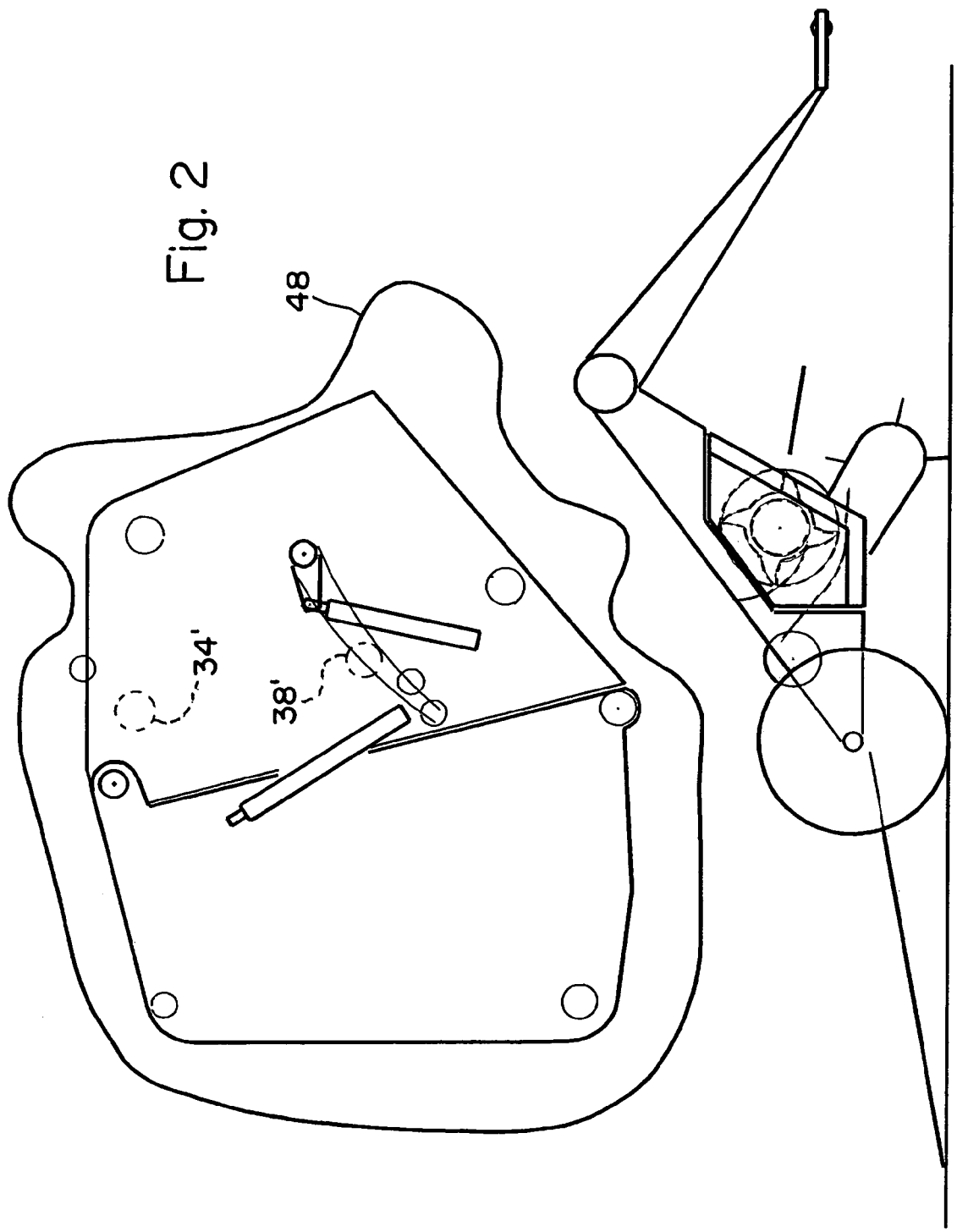

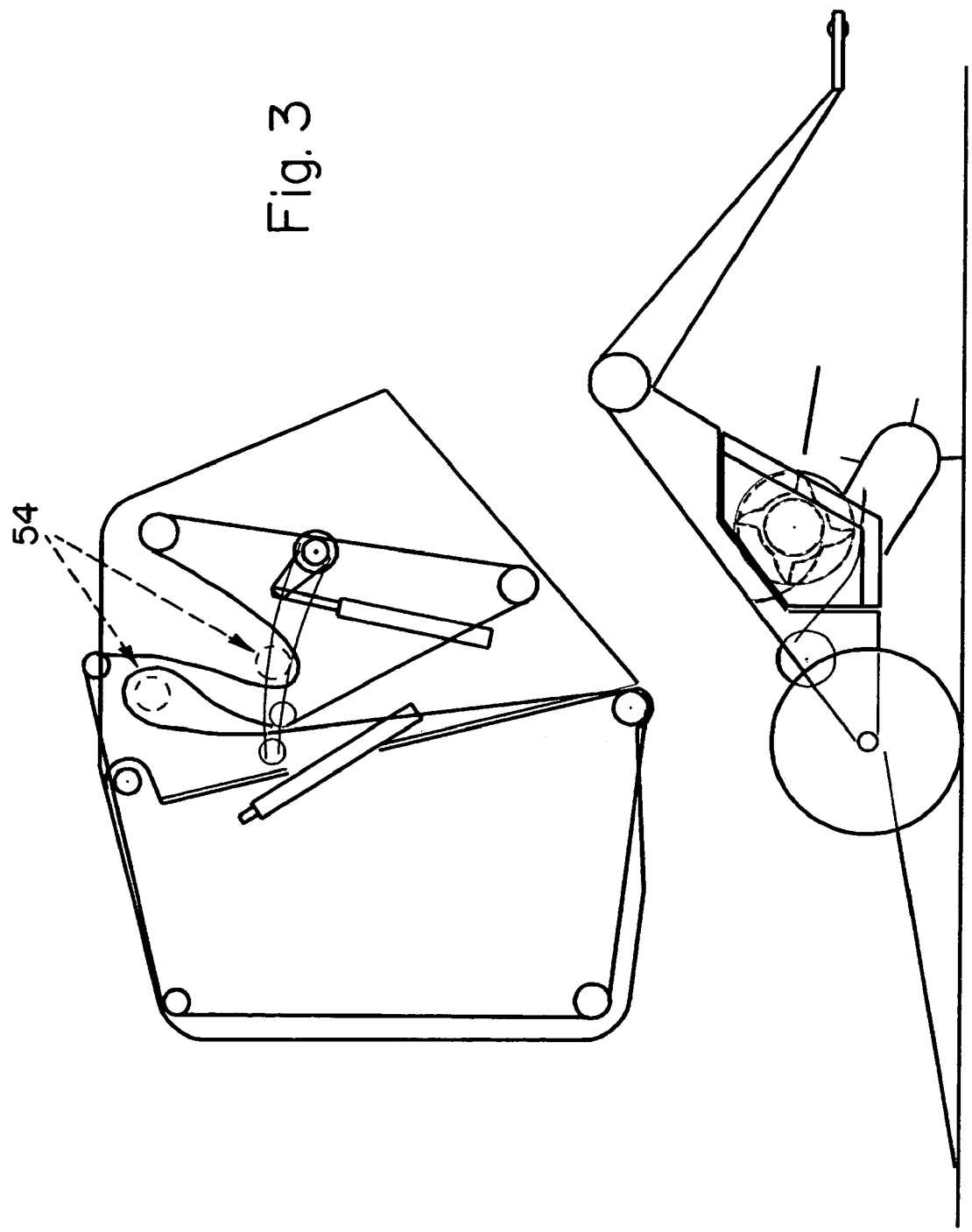

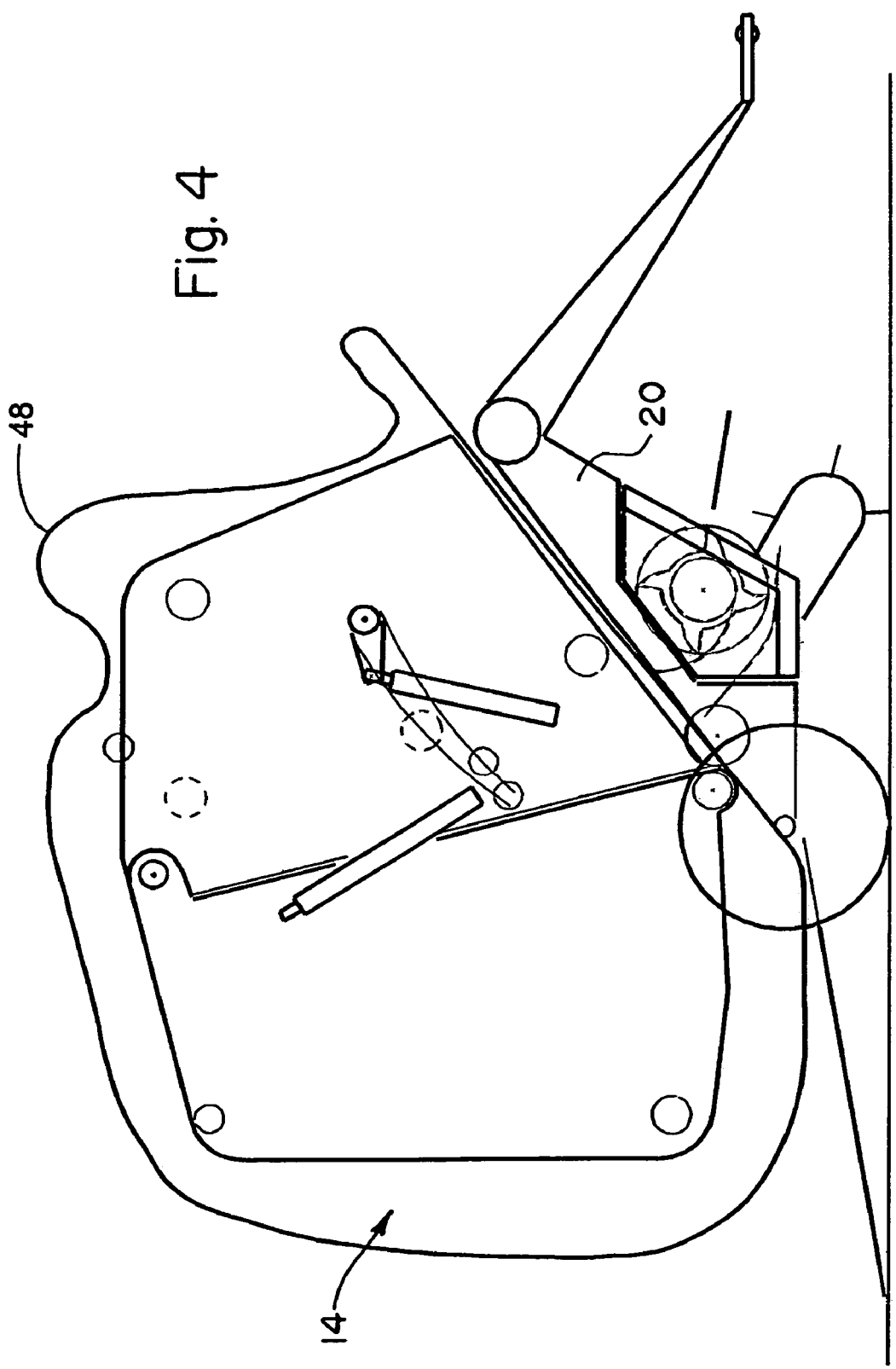

ROUND BALER ARRANGED TO FACILITATE THE INSTALLATION OF ENDLESS BALING ELEMENTS

FIELD OF THE INVENTION

This invention relates to a round baler comprising a chassis and a baling assembly, whereas the baling assembly comprises side structures separated from each other, cross beams connecting the side structures, rolls rotatably journalled in these side structures and/or on a tensioning arm and belts or the like, trained over said rolls and it relates to a method to install endless belts on a round baler.

BACKGROUND OF THE INVENTION

WO-A1-98/17097 discloses a round baler with side walls, rolls and belts, to the lower front end of which is attached a pick-up. In order to install the belts, they have to be finite and pulled at one end over all rolls and partly through gaps between adjacent rolls. When this is done, the ends of the belts are connected to each other. Since this work is cumbersome and since belt connectors are a source for costs and problems it would be desirous to use endless belts.

The problem this invention is based on is the impossibility to install endless belts on such type of a baler.

SUMMARY OF THE INVENTION

According to the present invention, there is provided a large round baler constructed for facilitating the mounting of endless bale-forming belts on the baler.

An object of the invention is to provide a large round baler constructed in such a way as to permit endless baling belts to be installed without necessitating the separation of the endless belt loop.

This object is accomplished by arranging cross beam members in such a way that they do not interfere with the mounting of the baling belts. According to this solution the circumferential sides (front, rear, bottom, up) of the baling assembly are free and endless belts can be moved like a ring laterally over the baling assembly and than concentrated towards the bale chamber. No chassis cross beam and no tying or net wrapping assembly obstruct the path of the belt(s). At the end, one or more releasably journalled rolls can be brought into their position, which apply the belts to the rolls already in place and tighten them. While it would be preferred to use belts, which are made endless from the very beginning, finite belts, the ends of which are connected can be used as well. Especially when a single and thus very heavy belt is used a mechanized installation of belts by means of a fork lift or the like is very advantageous. The side structure may be formed from side walls, i.e., sheet metal surfaces or by arms, by a frame of the like, as this is disclosed in EP-A1-1 308 078 or EP-A1-1 285 571.

Forming a baling assembly as a single and self-sufficient unit is even easier to do, if all other applying forces resulting from pulling the round baler over the field and from the weight and operation of all components are assumed by a chassis with wheels and a tongue, to which the baling assembly is connected. In such a case interfaces are provided at the chassis and the baling assembly, which easily can get separated. As another advantage various baling assemblies may get connected to such a chassis.

All known types of crop receiving and/or processing assemblies, like pick-ups, cutting means, windrowing means, humidifying means, etc. can be attached to the carrying structure either alone or in combination with each other. Since they are not connected to the baling assembly directly, the belts can be moved like a ring over the baling assembly, once it is lifted from the chassis. Height adjustment devices, like hydraulic actuators would act between the carrying structure and the respective crop receiving and/or processing assembly to move it into one or several operative positions and into an inoperative position.

Rather than to the baling assembly, if desired, bale handling assemblies can be attached to the carrying structure, like a bale wrapping means, a bale weighing means, a bale unloading means, a bale tying or netting means, etc., again either alone or in combination with each other. In prior art round balers such bale handling assemblies would often be attached to the baling assembly and obstruct the way of belts moved as a ring over the baling assembly.

Since with known balers it is normally a front part, which does not need adoption to another size or type of the rear part of the baler, it reduces assembly efforts, if said front part is fixed to the carrying structure, whereas a rear part is adapted to and fixed to said front part. For example, a round baler may have a front part with different settings of rolls, to which may be attached one of a set of different rear parts, with belts on rolls with different settings. This however does not exclude, that both—the front and the rear part—are attached to the carrying structure, such that in the case of a round baler the rear part is hinged to the carrying structure rather than to the front part.

The belts can be pressed onto the rolls and the lately installed rolls to press the belts on the rolls already in place, can be brought in place in a fixed structure of the baling assembly, if some of the rolls are replaceable while the structures are in place, in particular by means of shafts or stub shafts connectable to a roll body.

Freeing the circumference of the baling assembly may happen by disconnecting the whole baling assembly from the carrying structure and by lifting it therefrom by means of a crane or the like. Or access can be provided, if the baling assembly is hinged to the carrying structure such, that it can be tilted laterally about an axis extending substantially in the longitudinal direction of the baler. Latter solution does not require a crane but could be performed also with a jack stand or hydraulic actuator. The baling assembly would always remain connected to the carrying structure and could easily be returned to the initial position.

A tilting movement or even a removal of the baling assembly from the carrying structure is easy to accomplish, if the drives are easy to disconnect, like with chains, universal joint shafts, clutches etc., when disconnection is needed. Alternatively hydraulic hoses and couplings may be used. If the drives are present on the side, where the baling assembly is hinged to the carrying structure, universal joint shafts, universal joints, hydraulic or electric cables or the like may be provided, which can remain connected even when the baling assembly is in the tilted position.

A fast way to install endless belts on a baling assembly of a round baler is seen in following method, namely, a) the baling assembly is put into a position in which the rolls are radially free to the outside, b) the belt is moved as a ring over the baling assembly, c) at least one loop is formed by the belt and a roll is moved into this loop and fixed at the side structures to thereby apply the belt to the rolls, and d) a tensioning device is applied to either moveable rolls and/or to a belt strand between two rolls.

BRIEF DESCRIPTION OF THE DRAWINGS

Hereto after one embodiment of the invention is described in more detail and in relation to the drawing.

FIG. 2 shows the baler of FIG. 1 in a partly assembled stage with loose endless belts surrounding a baling assembly.

FIG. 3 shows the baler of FIG. 2, with the belts shown under tension.

FIG. 4 shows the baler of FIG. 2, with the baling assembly being shown moved away from a carrying structure by a short distance.

DESCRIPTION OF THE PREFERRED EMBODIMENT

Figure 1:
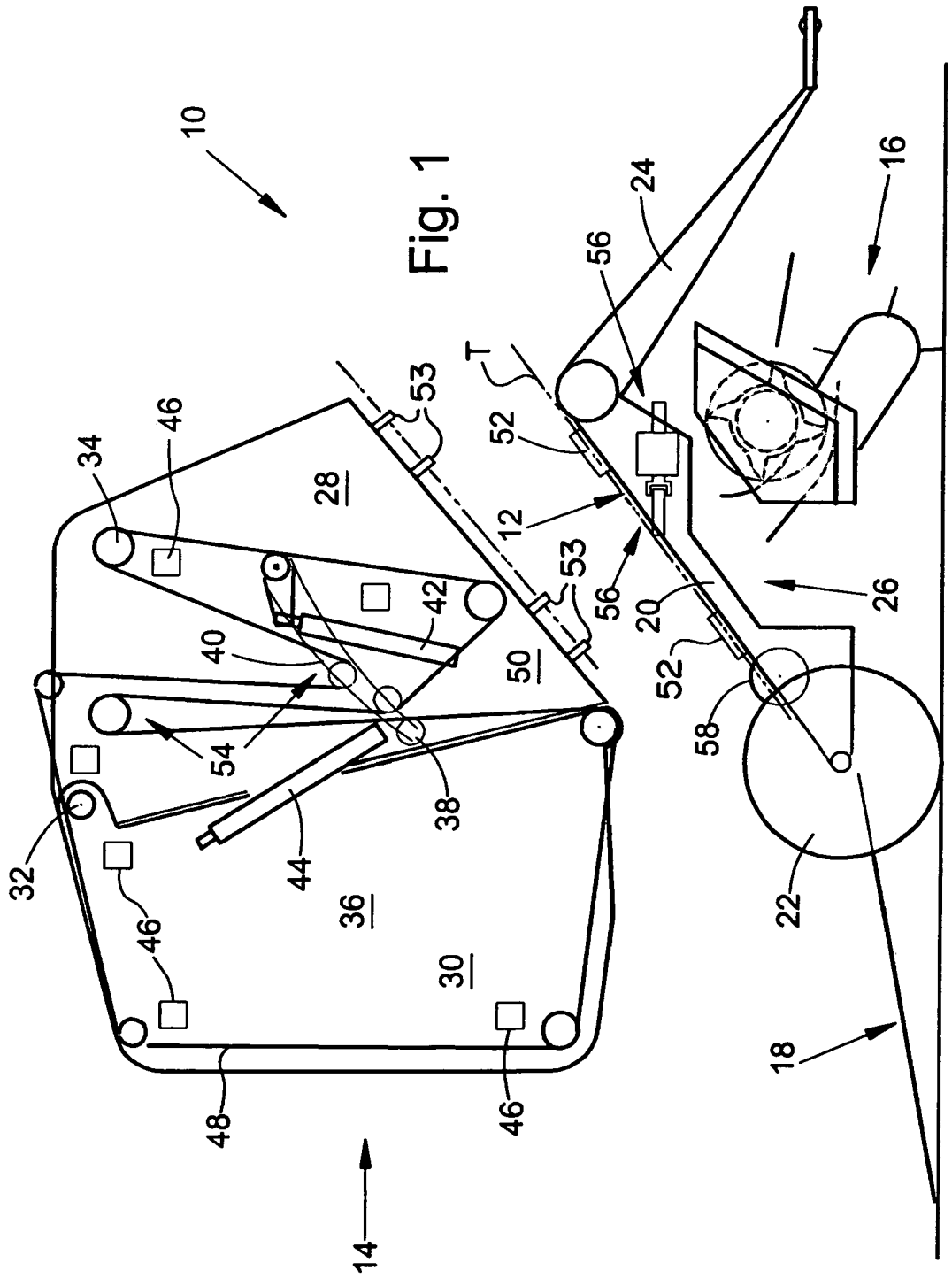
FIG. 1 shows a baler in a schematic side view with the components disassembled.

FIG. 1 shows a baler 10, having a chassis 12, a baling assembly 14, a crop receiving and/or processing assembly 16 and a bale handling assembly 18.

The baler 10 as shown is in the form of a round baler of the variable chamber type. The baler 10 is of the pull type, i.e., it gets attached to a tractor (not shown) or the like and is pulled during operation and transport.

The chassis 12 comprises a carrying structure 20, wheels 22 and a tongue 24. The chassis 12 is of a self-carrying structure to which all assemblies of the baler 10 can be attached.

The carrying structure 20 is made of beams, traverses, struts, axles, cross beams, etc. welded or bolted together to form a rigid piece. The carrying structure 20 is formed such, that it can assume, in an inner space or on its top side, the baling assembly 14, at its underside the crop receiving and/or processing assembly 16, and, normally at the back side or above the crop receiving and/or processing assembly 16, a bale handling assembly 18. The bale handling assembly 18 could be installed on any place which fits the purpose. Flanges or other interface connecting means are provided at places which are useful to receive either of the above assemblies 14, 16, 18. In the shown embodiment, the carrying structure 20 extends under an angle of about 45 degrees to the ground on which it stands and is connected to the tongue 24 at one end and to the wheels 22 at the other end. Two beams (only one shown) extend on each side in the longitudinal direction of the baler 10 and are interconnected by means of cross beams (not shown). Provided at the underside of the carrying structure 20 is a recess 26 to provide additional space for the crop receiving and/or processing assembly 16. Such a recess 26 or additional space may not be needed in other embodiments. While the carrying structure 20 here is shown in straight lines, it is obvious, that it may be of a different shape and layout, when this is necessary. Furthermore, the carrying structure 20 may be formed such that the baling assembly 14 is not fastened to its upper side, but is suspended from a portion high up. The carrying structure 20 is also provided with electronic controls (not shown) and drives 56 in the form of belts, chains, gears or hydraulic drives, whereas the one shown comprises a bevel gear with an universal joint. In a slight overlapping relationship to the wheels 22, a bottom roll 58 is rotatably received by the carrying structure 20. This bottom roll 58 is oriented and located such that it can support a round bale formed in this baling assembly 14.

The wheels 22 are rotatably connected to the carrying structure 20 either directly or via an axle (not shown). The wheels 22 may be arranged in tandem fashion, spring suspended or fixed, steerable or straight and with or without brakes. The arrangement of the wheels 22 is such that the baling assembly 14 in question can be readily connected to the carrying structure 20.

The tongue 24 is connected to the front end area of the carrying structure 20 in a vertically adjustable way. In other embodiments, the tongue 24 may be attached rigidly. Sufficient space is left below the tongue 24 and the carrying structure 20 to receive the crop receiving and/or processing assembly 16. Beyond that, the tongue 24 is of known construction.

The baling assembly 14 is formed by a front part 28 and a rear part 30, which are connected to each other in a bearing 32 with a pivot axis extending horizontally and transverse to the longitudinal direction of the baler 10. The baling assembly 14 is substantially of a known type in the form of a variable chamber round baler, in which a series of rolls 34 is rotatably received in side structures 36 and whereas other rolls 38 are carried by a tensioning arm 40 moving between end positions against the resistance provided by a tensioning means 42, like a spring or a hydraulic actuator. A hydraulic actuator 44 is provided to swing the rear part 30 about the pivot axle of the bearing 32 between a raised unload position and lowered baling position, as shown the drawings. This baling assembly 14 is formed as a self-carrying unit, which can be handled during assembly, transport etc. as a single and independent piece. For this purpose, struts and cross beams 46 are provided between and fixed to the side structures 30, to make the front and the rear parts 28 and 30, respectively, rigid units. The baling assembly 14 is provided furthermore with a set of belts 48, running parallel with little distance to each other over the rolls 34 and 38. Unless the belts 48 are manufactured in an endless fashion, the ends of the belts 48 are connected to each other to make the belts 48 endless. In other embodiments the belts may be replaced by a chain and slat conveyor or by a single belt. As can be seen in FIG. 1, the cross beams 46 are provided inside a space covered or surrounded by the belts 48 and close to a fixed roll 34, such that, even with a completed bale in a bale chamber 50, the belts 48 will not touch the cross beams 46. The location of the cross beams 46 is chosen such that, if the belts 48 are slid over the baling assembly and are concentrated towards the bale chamber 50, they are always in the shadow of the rolls 34 and are facing the inner side of the belts 48 as opposed to their outer side. Some of the rolls 34' and 38' are either made of multiple parts with a shaft or stub shafts and a roll body, or they can be inserted through holes in one of the side structures 36. This location of the beams 46 and the use of such rolls 34', 38' are reasons, why the belts 48 can be installed as will be described later. The underside of the front part 28 forms an interface to be connected to the upper side of the carrying structure 20. In this specific embodiment, front and rear mounting or bearing plates 52 are provided at each side of the carrying structure and include aligned openings lying along a longitudinally extending tilt axis T. Fixed to lower edges of each of the opposite side structures 36 are front and rear pairs of mounting lugs 53 that are spaced for receiving the bearing plates 52 between them and when coupled to the bearing plates establish a hinge joint at the respective tilt axis T about which the baling assembly 14 can be tilted when the fasteners establishing the coupling between the front and rear plates 52 and lugs 53 at one side of the carrying structure 20 and baling assembly 14 are removed.

The crop receiving and/or processing assembly 16 is formed as a pick-up with a subsequent cutting device combined to a single unit. In other embodiments it may be either of them or another crop receiving and/or processing assembly, like a mower. Usually this crop receiving and/or processing assembly 16 extends laterally beyond the carrying structure 20 and has a rearward delivery opening to feed the crop into the bale chamber 50. Contrary to the prior art, this crop receiving and/or processing assembly 16 is not connected directly to the baling assembly 14 but to the carrying structure 20, where it is suspended in a vertically moveable way, as this is known. Guide sheets or the like will be provided, where necessary, to provide for a secure feeding of the crop along the feed path, when the crop receiving and/or processing assembly 16 is adjusted in height. Interfaces (not shown) are provided at the underside of the carrying structure 20 and on the upper side of the crop receiving and/or processing assembly 16 to connect both to each other, whereas connection may happen via fast connectors, bearings, flanges or the like.

The bale handling assembly 18 is shown as a bale ramp, on which a bale can roll down, once the rear part 30 is swung up. Instead of or in addition to the bale handling assembly 18, a bale wrapper, a weighing device, a bale tying or netting device or the like could be attached to the carrying structure 20. The connection between the bale handling assembly 18 and the carrying structure 20 may be rigid or adjustable. The bale handling assembly 18 may include either means that is used to handle or process the bale, as opposed to the crop not being formed to a bale yet.

It is obvious from the above description, that various baling assemblies 14 and crop receiving and/or processing assemblies 16 and/or bale handling assembly 18 can be attached to the underside, upper side or rear side of the carrying structure 20 respectively to form a series of different balers 10.

Reference is made to FIGS. 2 and 3 to describe the method for installing the belts 48.

When new belts 48 have to be placed on the rolls 34, 38, either during initial production or for maintenance, the baling assembly 14 is either elevated relative to the mounting plates 52 to create a gap between the baling assembly 14 and the carrying structure 20 and the crop receiving and/or processing assembly 16 and the bale handling assembly 18 (see FIG. 4), or it is lifted completely for example by means of a fork lift or a crane, into a position as shown in FIGS. 2 and 3. In this situation, the circumferential surfaces of the baling assembly 14, i.e. its upper, lower, front and rear sides are freely accessible. All rolls 34, 38 are in place except those shown in dotted lines in FIGS. 2 and 3, which is the most forward one 38' on the tensioning arm 40 and the upper rearward one 34' in the front part 28. Loops 54 of the belts 48 are created between pairs of opposite rolls 34, 38, whereas the removable rolls 34', 38' serve as idling points for these loops 54. In order to install the belts 48, they are made endless and are slid over the side structures 46 to surround the circumferential surfaces, as shown in FIG. 2. As a next step, the missing rolls 34' and 38' are installed, which will tighten the loops 54 and apply all belts 48 to the adjacent surfaces of the rolls 34, 38. Finally, the tensioning means 42 is activated to provide for a tight connection. The situation in FIG. 4 is comparable to the situation in FIG. 2, except that the distance between the baling assembly 14 and the carrying structure 20 and the crop receiving and/or processing assembly 16 and bale handling assembly 18 is much smaller and assumes a size which is needed in the case of maintenance or repair, which should be performed with the least efforts. A little distance of about 0.02–0.10 m should be sufficient to install the endless belts 48 and can be reached by either lifting off the baling assembly 14 or by pivoting it about one or the other of the axes T running through the mounting plates 52.

Having described the preferred embodiment, it will become apparent that various modifications can be made without departing from the scope of the invention as defined in the accompanying claims.

The invention claimed is:

1. A method of installing at least one flexible endless baling element on a series of baling element support rolls extending between side structures of a baling assembly of a round baler, comprising the steps of:
   a) lifting the bailing assembly into a position in which said bailing element support rolls are radially free to an outside, said position creating a gap between the bailing assembly and a combination of a carrying structure and a crop receiving assembly;
   b) moving said at least one baling element like a ring over the baling assembly;
   c) forming at least one loop in said bailing assembly by said at least one bailing element,
   d) moving at least one further baling element support roll into said loop and mounting said at least one further baling element support roll to said side structures;
   e) have been replaced with the following applying tension by a tensioning means to said at least one bailing element extending between two of said bailing element support rolls to provide a tight connection.

* * * * *